April 30, 1957 G. WEBB, JR., ET AL 2,790,351
GUN CHARGER
Filed Jan. 6, 1955 2 Sheets-Sheet 1
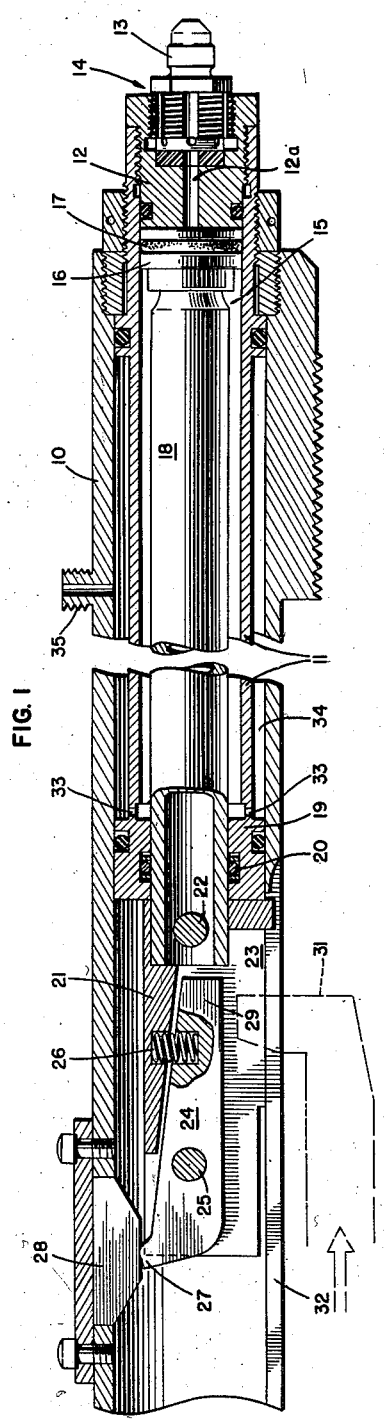
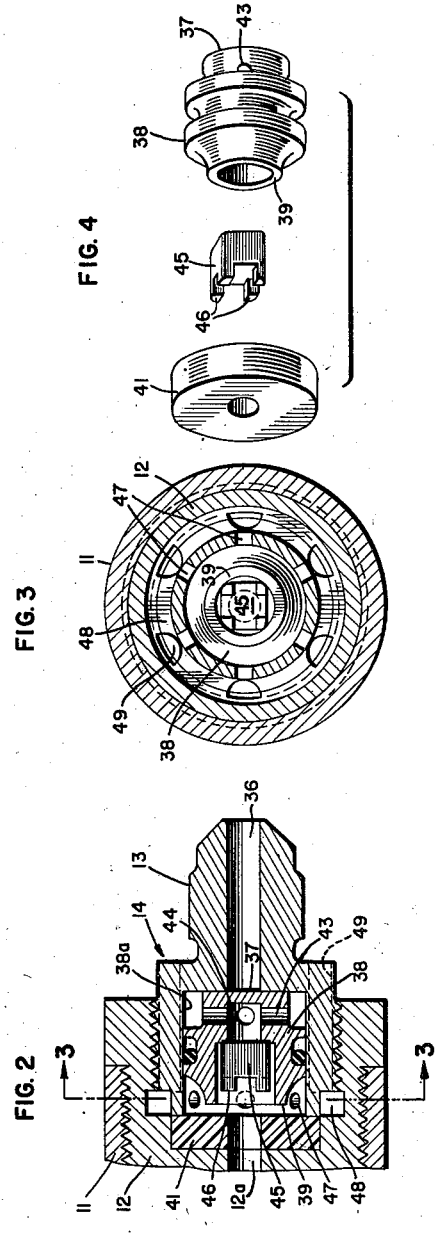
INVENTORS
GUY WEBB, JR.
DONALD F. ROMER
BY
ATTORNEYS

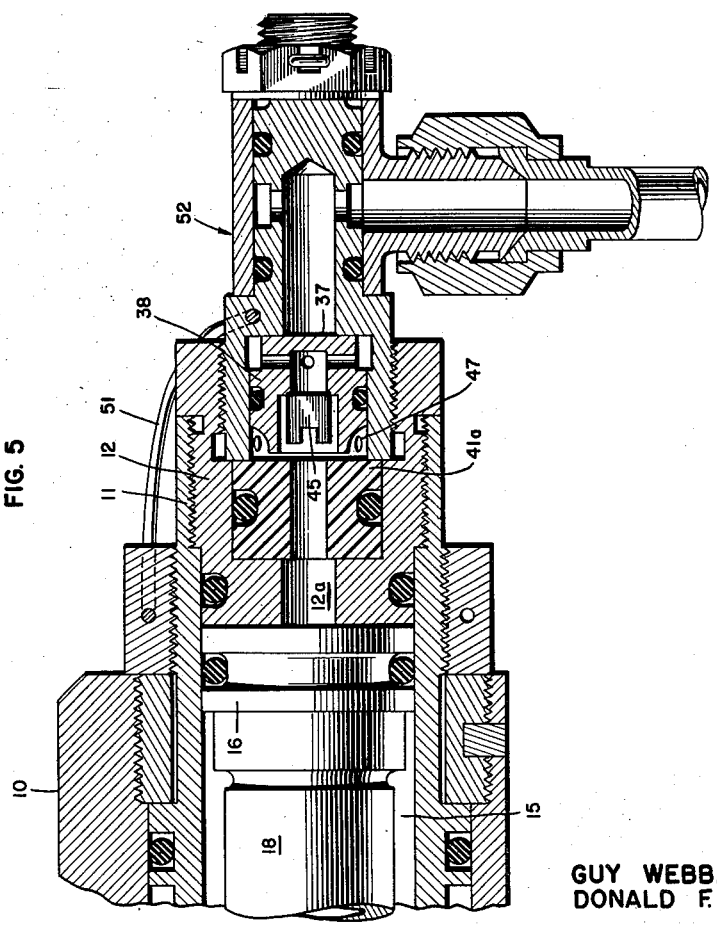

United States Patent Office 2,790,351
Patented Apr. 30, 1957

2,790,351
GUN CHARGER

Guy Webb, Jr., Hyattsville, and Donald F. Romer, Greenbelt, Md.

Application January 6, 1955, Serial No. 480,310

2 Claims. (Cl. 89—1)

(Granted under Title 35, U. S. Code (1952), sec. 266)

The invention described herein may be manufactured and used by or for the Government of the United States of America for governmental purposes without the payment of any royalties thereon or therefor.

This invention relates to gun chargers and more particularly to fluid operated actuators.

In modern warfare it is common for items of ordnance such as rapid fire machine guns and other equipment to be remotely situated and not conveniently accessible for manual operation in the event difficulty is encountered in the operation of the device such as jamming of an automatic firearm or the like.

In automatic guns and particularly automatic machine guns of the type where the reloading operation is effected by expansion of exploded gases behind the projectile, such guns will not ordinarily reload if there is an interruption of firing such as when a dud is encountered, since there will be no explosion to operate the parts. Accordingly, guns of this type are frequently equipped with charging means to eject dud rounds and insert live cartridges. When guns of this character are remotely situated as in aircraft, suitable remote control means must be provided in order to operate gun charging means to prepare the gun for subsequent firings.

It will be apparent that an actuator for gun charging purposes must be simple in construction, occupy a minimum space and possess a minimum number of mechanical parts. In addition, it must be capable of withstanding rough usage, be adapted to perform its actuation function in a minimum period of time and be readily adjustable so as to be adapted to various types of guns.

Accordingly, it is an object of this invention to provide a fluid operated actuator especially adapted to serve as a gun charger.

Another object is to provide an actuator with a maximum stroke for a minimum length of actuator body, having a minimum number of parts and sealing surfaces, which is light in construction, may readily be fabricated and is positive and rapid in operation.

Another object of the present invention is to provide means for controlling and operating a fluid actuator.

Another object is to combine with a fluid actuator, valve means adapted automatically to control the direction of movement of the actuator.

Another object is to provide a fluid actuator wherein fluid pressure is employed to return the parts and no spring need be used for this purpose.

Other objects and many of the attendant advantages of this invention will be readily appreciated as the same becomes better understood by reference to the following detailed description when considered in connectoin with the accompanying drawings wherein:

Fig. 1 is a longitudinal sectional view through an actuator embodying the present invention;

Fig. 2 is an enlarged, detailed, sectional view of the valve member comprising the extreme right-hand end of Fig. 1;

Fig. 3 is a transverse sectional view taken along a line substantially corresponding to line 3—3 of Fig. 2;

Fig. 4 is an exploded perspective view of the valve parts illustrated in section in Fig. 2; and Fig. 5 is a greatly enlarged longitudinal section through a valve end modified somewhat from that illustrated in Fig. 2.

In the embodiment illustrated the present invention is shown applied to automatic chargers for guns or the like, however, it will readily be appreciated that the invention may be utilized generally wherever an actuating device of this character is required.

In the embodiment illustrated in the drawings there is shown in Fig. 1 an elongated casing 10 having disposed therein a tubular liner forming an actuator cylinder 11 provided at one end with a cylinder head 12 having a central fluid admitting opening 12a by means of which high pressure air supplied to nipple 13 may pass through a valve member 14 and into the interior 15 of the liner. Within the liner is located a piston 16 which may be provided with suitable packing 17 which may be of O ring design and the piston 16 is affixed to the right-hand end of a piston shaft 18, the left-hand end of which extends through a bearing sleeve 19 sealed by suitable packing 20 as illustrated.

On the left-hand end of the piston shaft 18 is a clevis 21 retained by suitable means such as pin 22 and the clevis slot 23 receives a detent 24, having a detent pivot 25 and is normally urged downwardly by a detent spring 26. The left end of detent 24 has an upraised detent heel 27 which in the position illustrated in Fig. 1, is shown in engagement with a cam plate 28 to rotate the detent counterclockwise about detent pivot 25 to compress the spring 26 and retract the detent toe 29 at the opposite end of the detent out of engagement with a breech bolt operating lug 31 which extends upwardly into a cylinder slot 32 in the bottom of the casing.

It will be noted that upon completion of the movement of the piston to the right as shown in Fig. 1 the heel 27 of the detent engaging the cam plate 28 lifts toe 29 out of engagement with lug 31.

As shown in Fig. 1 a row of radially arranged ports 33 vent the space to the left end of the piston into the space 34 between the casing 10 and the liner 11.

It will be apparent that when fluid is admitted to the left side of the piston 16 by any suitable means, such as low pressure connection 35, the piston and its attached shaft will be forced to the right end of the cylinder. To reverse this direction of movement it is necessary merely to admit high pressure air through high pressure nipple 13 into the valve mechanism indicated generally as 14 in Fig. 1. The air thus admitted passes through central passage 36 of the nipple (Fig. 2) impinges against the end 37 of a valve 38 slideable in chamber 38a to shift it to the left so that the flange 39 of its opposite face bears against a valve seat 41 which may be of deformable material, such as nylon or the like and is centrally apertured to admit air into the cylinder head passage 12a. With the valve 38 shifted to the left, high pressure air enters valve chamber 38a, passes inwardly through radial openings 43 into a central valve chamber 44 and acts against the end of a free floating pilot valve block 45 which is provided with corners as illustrated in Fig. 4 so as to permit the flow of fluid about its sides. The incoming fluid shifts this block to the left until its legs 46 strike against the valve seat 41. The incoming high pressure air is thus admitted into channel 12a to impinge against the head of piston 16 and rapidly move the piston and its attached shaft 18 to the left.

It will be apparent that upon release and venting to atmosphere of high pressure air in channel 36 of nipple 13 the pressure differential between the inside of the actuating cylinder and the outside atmosphere will act upon pilot valve block 45 causing it to move to the right and seal chamber 44 whereupon the pressure will act upon the sliding valve 38 to shift it to the right to the position shown in Fig. 2. Such movement removes valve end flange 39 from valve seat 41 and permits air exhausting from the high pressure side of the piston to pass through radial vent openings 47 into an annulus 48 from which it may be vented to the atmosphere through longitudinally extending vent slots 49 passing to the outside of nipple 13.

If desired the actuating mechanism above-described may also be operated by the use of the same high pressure air applied to both sides of the piston 16 since the differential in area betwen the right-hand and the left-hand sides of that piston as shown in Fig. 1 and therefore equal pressures on opposite sides of the piston will cause the piston to move to the left and thereafter release of the pressure at the right side of the piston will cause the piston to return to the right.

In Fig. 5 is illustrated a slightly modified form of valve which may be used instead of the one illustrated in Fig. 2. In this modification the seat 41a is provided with an O ring seal, provision is made for a safety wire 51 and a different connection 52 for high pressure air is provided. The operation of this embodiment is the same as discussed with respect to Fig. 2.

In the application of the invention to automatic guns the operation of the actuator is as follows: When a round fails to fire and thus reject itself and insert a new round in the firing chamber, the breech bolt operating lug 31 will be left in an uncocked position substantially to the left of its dotted cocked position shown in Fig. 1. High pressure air is then applied through the nipple 13, to the valve 14 and subsequently acts upon piston 16 to move same to its maximum left-hand position in the cylinder 11. It will be seen that as the piston moves to the left the detent heel 27 will ride free from the cam plate 28 allowing the detent 24 to be rotated clockwise by the spring 26. Hence as the detent approaches the operating lug in its uncocked position it will ride up over the upstanding end of the lug and subsequently will be urged down behind same by the spring 26 into a latched position. The high pressure air acting against the right side of the piston is then vented to the atmosphere allowing the air pressure to the left of the piston in the chamber 34, which is greater than the atmospheric pressure, to move the piston and the detent to its maximum right-hand position shown in Fig. 1. As the piston approaches this position the detent heel will contact the cam rotating the detent in a counterclockwise direction thus freeing the detent toe 29 from engagement with the breech bolt operating lug and leaving same in cocked position such that automatic firing may be resumed.

Obviously many modifications and variations of the present invention are possible in the light of the above teachings. It is therefore to be understood that within the scope of the appended claims the invention may be practiced otherwise than as specifically described.

What is claimed is:

1. In a compact, lightweight, rapid acting gun charger for charging gas operated automatic guns, the charger being of the type having an elongated casing, a tubular cylinder concentrically disposed within the forward end of the casing, a reciprocating piston within the cylinder and having a piston rod extending into the rearward end of the casing, a fluid pressure source, valve means at the forward end of the cylinder for alternately admitting the fluid pressure to the cylinder to move the piston rearwardly to an extended position and subsequently venting the cylinder to the atmosphere to allow return movement of the piston to a retracted position, and a cocking mechanism operative within the casing and actuated by movement of the piston to cock the breech bolt lug of the automatic gun; the combination therewith of a clevis attached to and forming a horizontal extension of the piston rod, said clevis having side walls, a top flange member and a bottom portion defining an open ended longitudinal slot to permit travel of the breech bolt therein, a substantially rectangular-shaped detent pivotally mounted within the clevis between said side walls, the forward end of said detent defining an upwardly disposed detent heel projecting beyond the outer extremity of the clevis and the opposite end defining a portion adapted to engage the breech bolt during retraction of the piston, the upper edge of the rear portion of the detent adapted to extend in spaced parallel relationship to said top flange member of the clevis when the piston is in full retracted position, said top flange member and said top edge of the detent defining opposed aligned recesses, a detent spring disposed within said recesses for normally urging the detent in a clockwise direction such that the detent may engage the breech bolt in the longitudinal slot when the piston is moved to its extended position, and a downwardly depending cam plate, said cam plate disposed in the longitudinal path of movement of the clevis in a position in proximity to the position of the clevis when the piston is in its full retracted position to thereby engage said upwardly disposed detent heel as the piston reaches its full retracted position and rotate said detent in a counterclockwise direction against said spring and retain the detent in disengaged position to allow subsequent movement of the breech bolt during firing operations.

2. In a compact, lightweight, rapid acting gun charger for charging gas operated automatic guns, the charger being of the type having an elongated casing, a tubular cylinder concentrically disposed within the forward end of the casing, a reciprocating piston within the cylinder and having a piston rod extending into the rearward end of the casing, a clevis attached to and forming a horizontal extension of the piston rod, a detent pivotally mounted within the clevis and having an upwardly extending detent heel at one end projecting beyond the outer extremity of the clevis and having a lug engaging portion at the other end thereof, a detent spring for biasing the detent into an engaged position with the breech bolt lug of the gun, a cam plate projecting downwardly from said casing for moving the detent to a position disengaged from the breech bolt lug, a fluid pressure source, and valve means closing the forward end of the cylinder for alternately admitting fluid pressure to the cylinder to move the piston to an extended position in which the detent will engage the breech bolt lug and subsequently venting the cylinder to the atmosphere to allow return movement of the piston and cocking of the breech bolt; the combination therewith of a valve housing having a centrally disposed chamber therein, said housing defining a first aperture disposed between the pressure source and the forward end of the chamber, and a second aperture disposed rearwardly of said chamber and connecting said chamber with the forward end of the cylinder, said housing further defining radially extending ports positioned adjacent the rearward end of the chamber for venting said chamber to the atmosphere, a valve member slidably disposed in bearing relationship with the inner wall of said chamber and having a reduced portion at its forward end, said valve member having a longitudinally disposed chamber therein including a forward reduced portion and a rearwardly counterbored enlarged portion, said reduced portion of the valve member having passages extending therethrough into said forward reduced portion of the valve chamber, a free floating valve block disposed for axial sliding movement within the enlarged portion of the chamber in the valve member, a plurality of seating legs extending from the rearward portion of said floating valve block to present an interrupted seating surface when the block is in abutting relationship with the rearward wall of said housing chamber to thereby permit fluid flow into the cylinder.

(References on following page)

References Cited in the file of this patent

UNITED STATES PATENTS

| | | |
|---|---|---|
| 852,690 | Wright | May 7, 1907 |
| 1,526,025 | Street | Feb. 10, 1925 |
| 1,845,257 | Ferris | Feb. 16, 1932 |
| 2,252,418 | Shelley | Aug. 12, 1941 |
| 2,518,787 | Huhtala | Aug. 15, 1950 |
| 2,524,552 | Wales | Oct. 3, 1950 |
| 2,529,777 | McInnis | Nov. 14, 1950 |
| 2,618,982 | Mead | Nov. 25, 1952 |
| 2,681,958 | Linde | June 22, 1954 |